Patented Sept. 2, 1924.

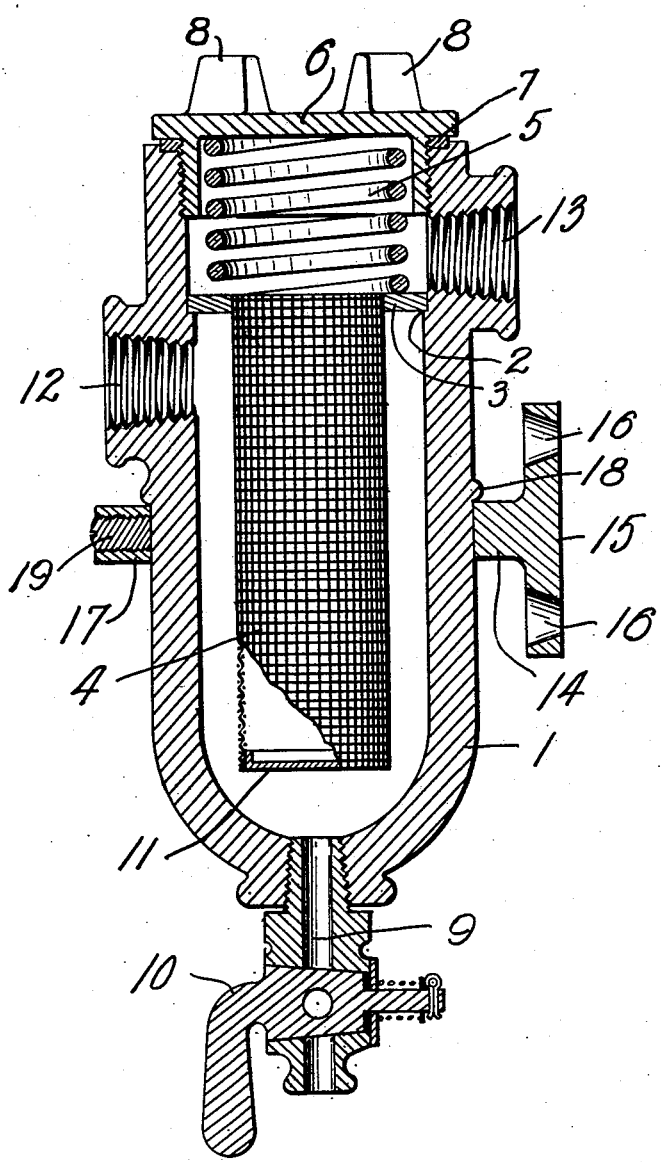

1,506,967

UNITED STATES PATENT OFFICE.

ALVAH H. BOSWORTH, OF WOODHAVEN, NEW YORK, ASSIGNOR TO THE BOSWORTH FILTER COMPANY, INC., OF LONG ISLAND CITY, NEW YORK.

LIQUID-FUEL STRAINER.

Application filed April 11, 1923. Serial No. 631,264.

*To all whom it may concern:*

Be it known that I, ALVAH H. BOSWORTH, a citizen of the United States, residing at Woodhaven, Long Island, in the county of Queens and State of New York, have invented certain new and useful Improvements in Liquid-Fuel Strainers, of which the following is a specification.

This invention relates generally to straining devices for liquid fuels and particularly to devices of this general nature which are adapted to be placed in the fuel intake pipe of an engine to filter the gasoline or other liquid fuel immediately before it passes through the carburetor.

The invention includes a filter of sufficient fineness of mesh to strain the gasoline and remove therefrom water and all impurities in solid form, a trap for receiving and retaining accumulations of water and other impurities removed from the gasoline in its passage through the filter, and a special construction of the filter by which it acts as an emergency relief valve to permit the direct passage of fuel to the engine in the event that the filtering element has become so completely clogged with impurities as to prevent the passage of fuel therethrough.

Other features of the invention will be hereinafter referred to.

In the drawings, in which a preferred form of the invention has been selected for illustration, the single figure shown is in the form of a vertical sectional view of the device.

Referring to the drawing for a more detailed description of the invention, a bulb-shaped trap or impurity receiving receptacle is shown at 1. The trap receptacle 1 is provided near its upper end with a shoulder or seat 2 adapted to receive in normal sealing engagement therewith the annular flange member 3 carried by the upper extremity of a tubular filtering member 4.

The flange 3 of the filter 4 is held to its seat by the pressure of a spring 5 preferably attached to the flange and bearing at its other end against a screw cap 6 which serves as a closure member for the upper end of the trap 1. A gasket 7 produces a leak proof joint between the cap 6 and the end of the trap 1 and suitable upstanding lugs 8 on the top of the cap afford convenient means for removal or replacement of the cap without the use of special tools other than a screw driver or the like.

The lower extremity of the trap receptacle 1 is provided with a drain passage 9 controlled by a suitable valve plug 10 through which impurities that have collected in the trap can be withdrawn as desired. The lower end of the filter 4 is closed with an imperforate disk or cap 11 which serves both to reinforce and strengthen the tubular filter, which may be formed of wire cloth of fine mesh or perforated sheet material, and to prevent injury to the filter by the insertion of a wire through the drain passage 9 in an attempt to clear a clogged filter or facilitate removal of accumulations from the trap.

It will be seen that the fuel inlet opening 12 of the device is set at a lower level than the outlet opening 13 so that the filter flange or collar 3 separates the two ports and insures that, in the normal operation of the device, the gasoline or other liquid must pass through the mesh of the filter screen 4 from the outside inwardly. It will be seen that this mode of operation causes the removal of impurities from the fuel on the outside of the filter from which they settle or fall into the enclosing chamber of the trap and from which they can be removed through the drain opening 9 as already explained.

The mounting of the filter in such manner as to provide for the holding of the flange 3 against the shoulder 2 under the pressure of the spring 5 forms what is in effect a relief valve, in that, in an emergency clogging of the filter tube, the collar 3 will lift as a valve from its seat and permit the passage thereby of sufficient liquid fuel to maintain the operation of the engine and prevent the danger of accident through the failure of the motor at a critical moment.

In order to facilitate the mounting of the filter device in any desirable position without placing weight or strain on the fuel intake pipe, a bracket 14 is provided which has a base member 15 provided with screw holes 16 for attachment to any fixed part, and a ring seat 17 to receive the bulb-shaped trap 1 which is preferably provided with a collar 18 which may rest on the ring 17 as indicated. A set screw 19 may provide convenient means for locking the trap rigidly in place in the ring seat. It will be seen that the trap may be turned angularly in its seat to any desired position of adjustment and can be held in any desired position of vertical adjustment as well.

It will be seen that a fuel straining or filtering device has been provided which will remove water as well as solid impurities from the gasoline or other liquid immediately before the liquid reaches the combustion chambers of the engine thereby insuring a clean and pure fuel supply that will manifest itself in a smooth and uninterrupted operation of the engine. The facility with which the trap chamber can be drained of sediment and the ease with which the cap can be removed from the trap for removal and replacement of the filter are distinct advantages inherent in the structure disclosed.

What I claim is:

1. In a fuel straining device for internal combustion engines, a casing forming a trap for impurities, the upper part of the casing being provided with vertically spaced apart inlet and outlet ports, an inwardly extending shoulder formed on the inner surface of the casing between said ports, a filter member having an outwardly extending flange adapted to rest on said shoulder, and spring means directly engaging the flange for normally holding the flange against the shoulder whereby the flange will function as a valve and lift from its seat if the filter becomes clogged.

2. In a fuel straining device for internal combustion engines, a casing forming a downwardly extending trap, the upper part of the casing being provided with vertically spaced apart inlet and outlet ports, an inwardly projecting shoulder extending around the inner surface of the casing between said ports, a hollow filter member extending downwardly into the trap and having an outwardly extending flange at its upper end adapted to rest on said shoulder, and spring means directly engaging the flange for normally holding the flange against the shoulder whereby the flange will function as a valve and lift from its seat if the filter becomes clogged.

3. In a fuel straining device for internal combustion engines, a casing forming a downwardly extending trap, the upper part of the casing being provided with vertically spaced apart inlet and outlet ports with the inlet port occupying the lower position, a removable tubular filter member extending downwardly into the trap, said filter being spaced from the walls of the trap and an imperforate member closing the lower end thereof, means for preventing the passage of liquid from the inlet to the outlet port except through the walls of the filter, a drain cock in the lower end of the trap, a closure cap for the upper end of the trap and an expansion spring bearing at one end against the cap and at the other end against the filter.

4. In a fuel straining device for internal combustion engines, a casing forming a downwardly extending trap, the upper part of the casing being provided with vertically spaced apart inlet and outlet ports with the inlet port occupying the lower position, an inwardly projecting shoulder extending around the inner surface of the casing between said ports, a hollow filter extending into the trap and spaced from the walls thereof, an outwardly extending flange at the upper end of the filter adapted to engage the shoulder to support the filter, a closure cap for the upper end of the trap and an expansion spring bearing at one end against the cap and at the other against the flange on the filter.

5. In a fuel straining device for internal combustion engines, a casing forming a downwardly extending trap, the upper part of the casing being provided with vertically spaced apart inlet and outlet ports with the inlet port occupying the lower position, an inwardly projecting shoulder extending around the inner surface of the casing between said ports, a hollow filter member having walls formed of filtering material and having an imperforate lower end, said filter member extending downwardly into said trap and spaced from the walls thereof, an outwardly extending flange at the upper end of the filter adapted to engage the shoulder to support the filter, a closure cap for the upper end of the trap, an expansion coil spring bearing at one end against the cap and at the other against the flange on the filter and a drain cock in the lower end of the trap.

6. In a fuel straining device for internal combustion engines, a casing forming a downwardly extending trap, the upper part of the casing being provided with vertically spaced apart inlet and outlet ports with the inlet port occupying the lower position, an inwardly projecting shoulder extending around the inner surface of the casing between said ports, a hollow filter member extending into the trap and spaced from the walls thereof, an outwardly extending flange at the upper end of the filter adapted to engage the shoulder to support the filter, a closure cap for the upper end of the trap, and a spring bearing against the flange to normally hold the flange in contact with the shoulder, the spring being compressed by engagement at the other end with the closure cap.

7. In a fuel straining device for internal combustion engines, a casing forming a downwardly extending trap, the upper part of the casing being provided with vertically spaced apart inlet and outlet ports with the inlet port occupying the lower position, an inwardly projecting shoulder extending around the inner surface of the casing between said ports, a hollow filter member having walls formed of filtering material and having an imperforate lower end, said filter member extending downwardly into said trap and spaced from the walls thereof, an outwardly extending flange at the upper end of the filter adapted to engage the shoulder to support the filter, a drain cock in the lower end of the trap, a closure cap for upper end of the trap, and a spring carried by the flange and adapted to be put under compression by engagement with the closure cap to normally hold the flange against the shoulder in the relation of a valve to its seat.

ALVAH H. BOSWORTH.